Patented Jan. 9, 1934

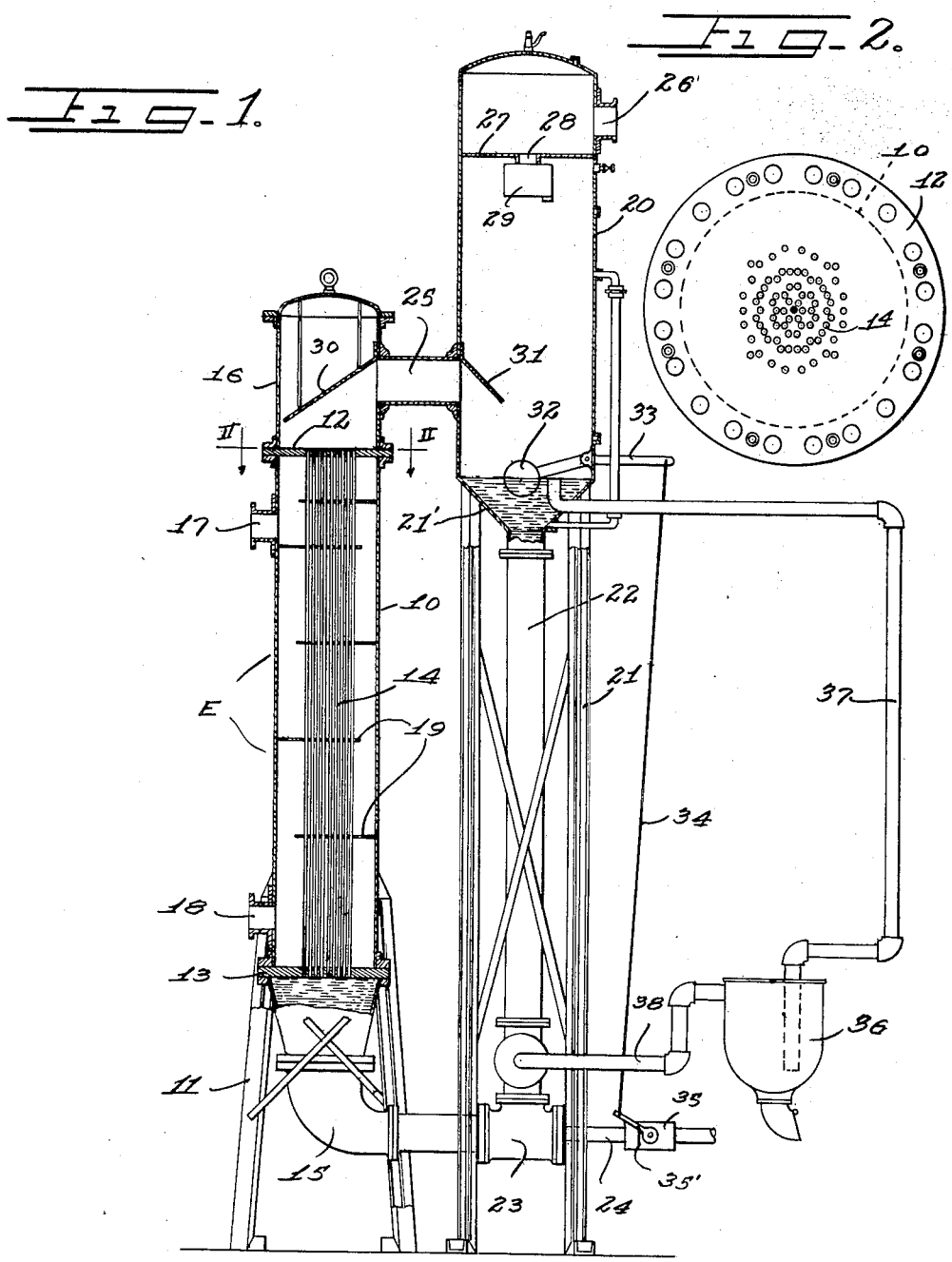

1,943,106

UNITED STATES PATENT OFFICE 1,943,106

EVAPORATOR

Clifford L. Burnham, Chicago, Ill.

Application July 6, 1931. Serial No. 548,896

2 Claims. (Cl. 202—197)

My invention relates to evaporator apparatus which is particularly useful for making up feed water for steam boilers.

An important object of the invention is to overcome the disadvantages of present commercial types of feed water make up evaporators in which the heat transfer between the heating medium and the water to be vaporized is not very efficient because of slow velocity of circulation of the water which permits scales to form on the water tubes which reduces the heat transferred.

A further object of the invention is to prevent the formation of scale in the evaporator tubes by treating the raw water by any of the customary softening compounds before it is delivered to the evaporator circuit, and to connect with the separator or flash chamber, which receives the combined water and vapor from the evaporator, a circuit which connects with the separator to receive therefrom at the point of highest concentration therein the water containing the sludge, mud or any suspended matter and to conduct this water to a sludge removing device from which the clear water is delivered back into the evaporator circuit, thus keeping the concentration of scale forming products down to a point where scale will not deposit on the inside of the tubes under the temperature and velocity at which the water flows through the tubes.

Besides the features specifically referred to, my invention involves other features of construction, arrangement, and operation all of which are shown incorporated in the structure on the drawing, in which drawing, Figure 1 is a more or less diagrammatic view of the various elements forming part of my improved evaporating system, some of these elements being in section; and Figure 2 is an enlarged section on plane II—II of Figure 1 showing the arrangement of the water tubes in the evaporator.

The heat interchanger or evaporator structure E comprises a shell 10 which may be cylindrical and which is mounted in upright position on a suitable supporting structure 11, the ends of the shell being closed by upper and lower crown sheets or heads 12 and 13. Extending between and supported by the sheets 12 and 13 are the heat exchanger tubes 14 which are long and of comparatively thin metal and which have a comparatively small inside diameter. An inlet header or fitting 15 is secured to the lower end of the shell 10 for delivering the water to be treated into the lower ends of the tubes 14. Mounted on top of the shell 10 is the top header structure 16 which receives the combined water and vapor or steam from the upper ends of the tubes 14.

As clearly shown in Figure 2 the tubes 14 are clustered to extend through the central part of the shell 10 leaving space between the tubes and the shell for the flow of the heating medium such as steam which enters at the inlet 17 and leaves at the outlet 18, the inlet being preferably at the top and the outlet at the bottom of the shell. Within the shell I preferably provide transverse baffles 19 through which the tubes extend, these baffles being suitably spaced vertically and alternate baffles being spaced from opposite sides of the shell so that the heating medium must flow in a zigzag or circulatory path through and around the tubes at considerable velocity and with intimate extended contact with the tubes for a rapid interchange of heat.

Alongside of the evaporator or heat interchanger structure E a separator or flash tank 20 is mounted on a supporting trestle 21 with its axis vertical. The conical outlet end 21' of this separator tank is substantially opposite the upper end of the shell 10 and is connected through a pipe 22 with a T fitting 23 whose outlet connects with the delivery header 15 for the evaporator E, the feed water delivery pipe 24 connecting with the inlet of the T fitting. The water collected in the separator 20 may thus flow back for repassage through the evaporator structure E.

The separator tank 20 is comparatively long and near its lower end, above the water level therein, has connection with the upper header 16 of the evaporator structure E through a conduit 25. At the upper end of the separator tank is the outlet 26 for the vaporized feed water. In advance of the outlet 26 a partition 27 extends across the separator tank and has the passage 28 in which is interposed a centrifugal steam purifier device 29 through which the vapor or steam must flow before reaching the outlet 26 and has the water particles separated therefrom, which water particles drop to the bottom of the tank.

A baffle 30 may be provided in the top header 16 of the evaporator structure E and inclined downwardly in front of the cross duct 25 for directing the steam and vapor for flow into the separator 20, and a baffle apron 31 may be provided to overhang the outlet of the duct 25 in the path of the vapor and steam flowing into the separator chamber, this deflector tending to deflect any water particles carried with the steam or vapor to the bottom of the separator chamber.

A constant water level is preferably maintained in the separator tank 20 and the inflow of feed water from the supply source to the evaporator structure E is controlled by this water level. I have shown a float ball 32 in the separator 20 on the inner end of a lever 33 whose outer end is connected by a rod or cable 34 with the valve stem lever 35' of a suitable valve structure 35 interposed in the feed water supply pipe 24. With such arrangement, when the water in the separator chamber rises above a predetermined level, the float will swing the lever 33 and the valve 35 will be correspondingly closed. If the level drops the valve will be correspondingly opened.

The level of the water in the separator will thus determine the level of the water in the tubes 14, the level in the separator tank being automatically kept below the level of the upper ends of the tubes.

Any mud, sludge or other foreign matter in the feed water will be held suspended in the water particles which are separated from the vapor in the separator tank 20, and I provide means for withdrawing the suspended matter from the water in the separator tank and removing it in a suitable sludge removing device. Such device may be of any well known construction. The device shown comprises the receptacle 36 into which a pipe 37 projects downwardly from the top to a distance above the bottom thereof, the outlet pipe 38 extending laterally from near the top of the receptacle. The pipe 37 extends at its upper end into the bottom of the separator 20 and terminates near the surface of the collected water therein, while the outlet pipe 38 from the sludge remover connects with the T fitting 23. With this arrangement a greater part of the sludge and foreign matter laden water particles dropping down in the separator 20 flow into and through the pipe 37 and to the bottom of the sludge remover receptacle 36, the sludge, mud and other foreign matter being settled by gravity at the bottom of the receptacle and the clear water flowing out through the pipe 38 for return to the evaporator structure E for repassage through the tubes 14. The mud, sludge or other suspended matter which may be in the feed water is thus constantly being removed therefrom during operation of the evaporating system.

The raw water from which the feed water is to be produced is first chemically treated and/or softened in a suitable tank or other receptacle (not shown) and the treated water flows through the pipe 24 to the evaporator structure under control of the valve 35. As the water flows upwardly through the tubes 14 and is rapidly heated by the steam or other heating agent flowing through the shell 10, the water is rapidly vaporized or converted into steam and the resulting high velocity flow through the tubes produces a scouring action which will prevent settling of any mud, sludge or suspended matter on the tubes to form scale, and will carry such matter upwardly with the steam and vapor into the separator 20, in which separator the water particles containing the foreign matter will be entrained out of the steam and vapor and will drop to the bottom of the separator to be picked up by the pipe 37 for delivery to the sludge removing receptacle 36 to be cleaned. During operation of the system this continuously operating cleaning circuit will keep the concentration of scale forming solids down to a point where the heat and velocity in the tubes 14 will prevent deposit of such solids to form scales, and the tubes 14 will thus be kept clean and unobstructed for the most efficient and rapid reception of heat by the water from the heating medium surrounding the tubes.

The outlet 26 of the separator 20 is at a sufficient distance above the level of the water at the bottom of the separator so as to give the water particles a chance to separate from the vapor or steam, any water particles remaining being then thrown out by the centrifugal purifier device 29, and only clean, dry vapor or steam will be delivered from the separator.

The downflow pipe 22 from the separator is of sufficiently large diameter so that the water accumulated in the separator may flow rapidly back to the evaporator structure for repassage through the tubes 14, the water represented by the vapor and steam flowing from the outlet 26 of the separator being compensated for by flow of water from the water supply tank under control of the valve 35, the valve being opened by operation of the float 32 for additional inflow of water from the supply tank when the level in the separator falls below a certain point.

Some of the sludge and other scale forming matter may escape from the separator and flow through the pipe 22 back to the evaporator structure, but the amount will be so small that the heat and velocity flow in the evaporator structure will prevent settling of the matter and the formation of scale. The greater part of the sludge containing water dropping down in the separator 20 is drawn off through the pipe 37 and passed through the sludge removing device before repassage through the evaporator structure and the formation of scale in the evaporator tubes is thus effectively prevented, and the tubes will always operate at full heat interchange efficiency.

I do not desire to be limited to the exact arrangement and operation shown and described as changes may be made without departing from the scope of my invention as defined by the appended claims.

I claim as follows:

1. A steam generator comprising a vertical shell having crown-sheet means therein defining a bottom chamber for incoming water, a top chamber for outgoing steam, and an intermediate chamber for the flow of a heating medium, tubes connecting said crown-sheets and opening into the bottom and top chambers, said shell being provided with an upper inlet and a lower outlet for a heating medium, another shell defining a flash chamber positioned extending above the top chamber of said first shell, said second shell having an inlet connection with said first shell for steam, and defining a reservoir below the inlet for water, said second shell having an upper outlet for steam and being provided with means interposed between its inlet and its outlet to reject water particles from steam, a vertical conduit connected extending between the bottoms of said first and second shells adapted to normally provide a water leg, another conduit connected extending between said second shell and a lower portion of said first conduit adapted to by-pass solid matter on the surface of water in said reservoir and to provide a path in parallel fluid flow relation to said first conduit, means connected in said second conduit adapted to entrap sludge passing therethrough, a connection in fluid communication with said first shell for make-up water, and means connected to said make-up connection to maintain a predetermined height of water in the reservoir.

2. A steam generator comprising a first vertical conduit and a second vertical conduit adapted to contain water and connected at their lower ends to normally provide a pair of substantially equal water columns, a shell surrounding a portion of said first conduit to define a chamber therewith for the passage of a heating medium, means connected defining chambers for steam surmounting connected with said conduits, a third conduit connected in parallel flow relation with said second conduit, said third conduit having an inlet positioned within said second conduit and opening near the upper surface of the water therein to by-pass sludge, and means to trap sludge connected in said third conduit, said third conduit being connected to said second conduit at the lower end of said second conduit.

CLIFFORD L. BURNHAM.